United States Patent [19]

Hodgson

[11] 4,187,089
[45] Feb. 5, 1980

[54] HORIZONTAL VAPOR-LIQUID SEPARATOR

[75] Inventor: Robert A. Hodgson, Tulsa, Okla.

[73] Assignee: Maloney-Crawford Tank Corporation, Tulsa, Okla.

[21] Appl. No.: 919,121

[22] Filed: Jun. 26, 1978

Related U.S. Application Data

[63] Continuation of Ser. No. 761,963, Jan. 24, 1977, abandoned.

[51] Int. Cl.² .............................................. B01D 45/12
[52] U.S. Cl. ....................................... 55/219; 55/457; 55/463; 55/DIG. 25
[58] Field of Search ................................... 55/184–186, 55/191, 201, 219, 396, 456, 457, DIG. 25, 203, 463

[56] References Cited

U.S. PATENT DOCUMENTS

| 899,820 | 9/1908 | Abbot, Jr. ................................ 55/456 |
| 1,735,298 | 11/1929 | Pfeffer .................................... 55/456 |
| 1,952,281 | 3/1934 | Ranque ................................... 55/457 |
| 2,193,209 | 3/1940 | Sandberg ................................ 55/219 |
| 2,899,014 | 8/1959 | Sinex ...................................... 55/186 |
| 3,413,778 | 12/1968 | Lavery et al. ........................... 55/186 |
| 3,633,342 | 1/1972 | Richardson ............................. 55/457 |
| 3,884,660 | 5/1975 | Graff et al. ............................. 55/456 |

FOREIGN PATENT DOCUMENTS 1078415  3/1960  Fed. Rep. of Germany ............. 55/396

*Primary Examiner*—David L. Lacey
*Attorney, Agent, or Firm*—Head & Johnson

[57] ABSTRACT

An improved horizontal vapor-liquid separator providing a separation chamber, a horizontal inlet conduit having internal vanes for imparting a helical motion to fluid flow therethrough, a series of at least three pipe separators coaxially aligned with the inlet conduit and spaced apart to form annular orifices for the collection of heavier droplets forced to the inner peripheries of the piping by the centrifugal force, a conical baffle located in the path of the flow discharged from the end of the last separator pipe for coalescing final traces of liquid by impingement, and a vapor exhaust conduit coaxially aligned with the inlet conduit. A second chamber located beneath the separation chamber collects the liquid by gravity flow and utilizes a liquid level control system to maintain a vapor barrier while discharging the collected liquid at the same rate of accumulation.

4 Claims, 2 Drawing Figures

HORIZONTAL VAPOR-LIQUID SEPARATOR

This is a Continuation of Application Ser. No. 761,963 filed on the Jan. 24, 1977 now abandoned.

BACKGROUND OF THE INVENTION

Vapor-liquid mixtures are often encountered in the process industries. The dispersion of liquids in gas streams inlcude unstable mixtures which usually must be separated prior to further processing of the phases. Most dispersions will separate naturally if left undisturbed, however, the natural separation rate is often too slow for economic consideration.

One variety of artificial separator commonly employed to accelerate the separation rate of dispersion utilizes centrifugal force of the entrained droplets for separation. A second variety relies upon the impingement and coalescing of the entrained liquid upon a suitable obstruction placed in the path of the flow stream.

Heretofore the prior art separators have been bulky and/or inefficient in achieving the desirable phase separation. An object of the present invention is to achieve efficient phase separation with minimum pressure drop in an inline installation without the use of complicated structure.

SUMMARY OF THE INVENTION

The present invention contemplates a horizontal vapor-liquid separator designed for inline installation for the efficient phase separation of a vapor-liquid mixture with relatively low pressure drop of the flow stream passing through the separator.

The invention includes a housing providing an elongated separation chamber. A horizontal inlet tubing, having internal vanes for imparting a helical motion to fluid flow therethrough, extends through the housing wall into the chamber. A series of at least three separator pipes are mounted in spaced coaxial alignment with the inlet tubing to form a minimum of three annular orifices. The heavier entrained liquid droplets hurled to the inner peripheries of the tubing and pipes by centrifugal force pass through the orifices aided by the generally forward movement of the stream. A conical baffle is placed near the end of the pipe series in coaxial alignment therewith. The baffle reverses the generally forward flow of the stream and any remaining liquid droplets impinging upon the baffle as a result of their forward momentum are coalesced. An exhaust tubing, extending through the housing wall into the chamber in coaxial alignment with the inlet tubing and terminating behind the baffle permits substantially liquid-free vapor to flow from the separation chamber.

The liquid trapped in the separation chamber flows by gravity through one or more downcomers to a separate liquid accumulation chamber. In the latter chamber, a normal liquid level is maintained as a vapor barrier by means of suitable level control apparatus, and the liquid is withdrawn from the bottom of the accumulation chamber at a rate equal to the liquid collection rate.

DETAILED DESCRIPTION OF THE PREFERRED EMBODIMENT

Figure 1:
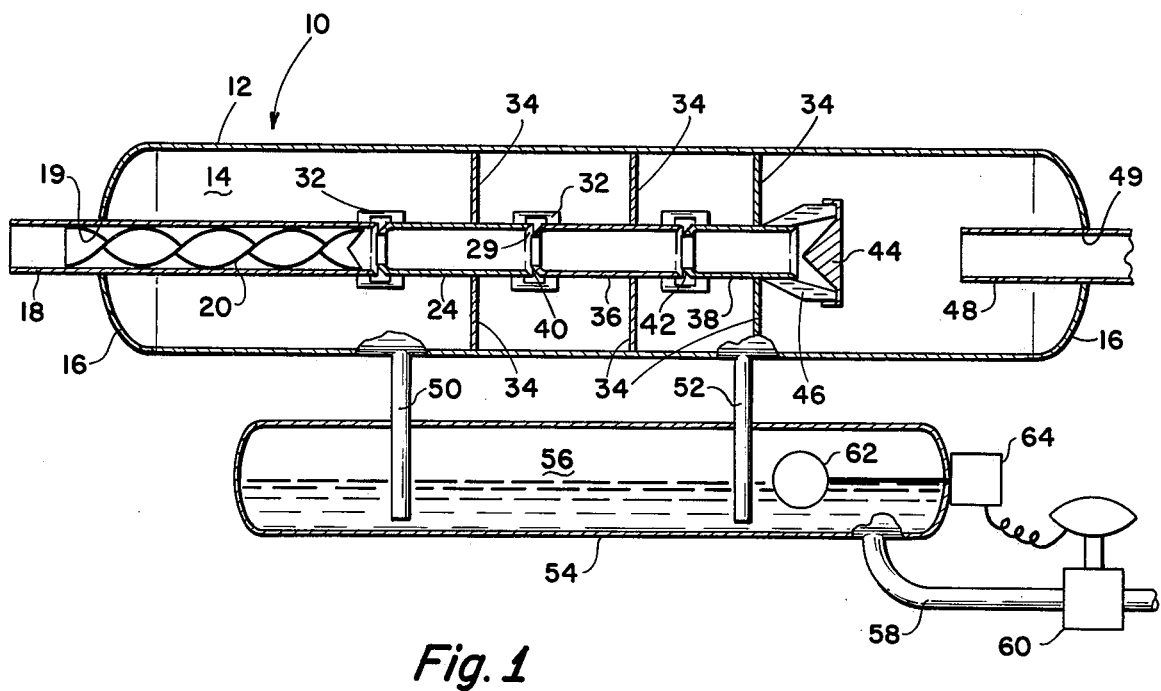
FIG. 1 is a sectional elevational view of the horizontal vapor-liquid separator embodying the invention.

Referring to the drawings in detail and in particular to FIG. 1, reference character 10 generally indicates a horizontal vapor-liquid separator comprising a housing 12 having an elongated chamber 14 therein for the collection of entrained liquid in a manner as will be hereinafter set forth. The heads 16 of the housing 12 as shown in FIG. 1 are of an elliptical configuration for pressure service, although the actual configuration thereof plays no significant role in the invention.

Figure 2:
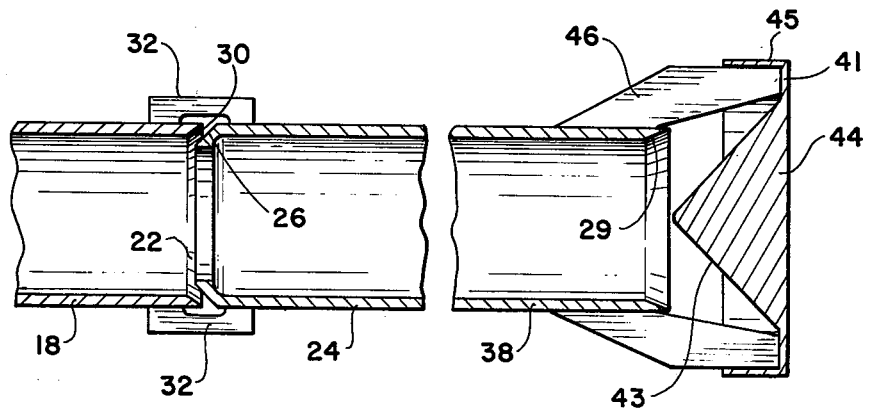
FIG. 2 is a broken enlarged sectional elevational view of a portion of a separator embodying the invention and showing the relative spatial arrangement of the tubing and baffle members.

An inlet tubing 18 extends through a central port 19 provided in left-hand head 16 of the housing 12 as viewed in FIG. 1 and into the chamber 14. A spiral vane 20 is secured in any suitable manner to the inner periphery of the inlet tubing 18 for imparting a helical flow pattern to any flow stream moving therethrough. As shown in FIG. 2, the inner periphery of the downstream end 22 of inlet tubing 18 is preferably beveled outwardly to form a generally frusto-conical shape.

A pipe 24 is disposed in the chamber 14 in substantial coaxial alignment with the inlet tubing 18, and has one end thereof swaged inwardly as shown at 26 to form a generally frusto-conical outer facing. The inner periphery of the opposite end of the pipe 24 is beveled outwardly as shown at 29 in a generally frusto-conical shape. The swaged end 26 of a pipe 24 is inserted in the beveled end 22 of inlet tubing 18 but spaced apart therefrom to form an annular orifice 30 flaring outwardly in a down-stream direction. The tubing 18 and the pipe 24 are secured in spaced but aligned relationship by spacer elements 32 which span the orifice 30 and are secured between the inlet tubing 18 and pipe 24 in any suitable manner (not shown). The pipe 24 is preferably concentrically disposed within the housing 12 and may be supported therein by numerous means; but as shown in FIG. 1, the pipe 24 is supported by a plurality of struts 34 secured between the outer periphery of the pipe and the inner periphery of the housing 12.

A pair of pipes 36 and 38, substantially identical to pipe 24, is coaxially aligned behind pipe 24 in spaced swage-to-bevel sequence by means of spacer elements 32 to provide additional orifices 40 and 42 which are substantially identical to the orifice 30. Similarly to pipe 24, the pipes 36 and 38 are preferably supported in the chamber 14 by struts 34 attached to the inner periphery of the housing wall 12.

A baffle 44, having an inwardly directed substantially conical face 43, is coaxially aligned with pipe 38 and spaced apart from the beveled end 29 thereof by means of axially extending circumfernetially spaced rib members 46 secured between pipe 38 and the baffle base 41. The cone apex of baffle 44 is directed toward the end of pipe 38, and the base 41 of the cone is extended radially to form a circumferential cup-like projection 45 as shown in FIG. 2.

Exhaust tubing 48 is disposed in substantial coaxial alignment with inlet tubing 18 and spaced downstream from the baffle 44. The exhaust tubing 48 extends from the interior of chamber 14 through a central aperture 49 provided in the right-hand head 16, as viewed in FIG. 1.

A second housing 54 is secured beneath housing 12 and provides a liquid accumulation chamber 56. A pair of downcomers 50 and 52 are secured to the lower portion of housing 12 in open communication with chamber 14 and extend downwardly through the upper wall of housing 54 into open communication with the liquid accumulation chamber 56. A liquid draw line 58 is connected to the bottom of housing 54 in open communication with chamber 56 for withdrawal of liquid therefrom. A control valve 60 is interposed in the draw line 58 and is operated by a suitable valve actuator 64 which is operably connected to a float 62 which is disposed in the chamber 56. The valve 60 is preferably preset to open when the liquid level maintained in the accumulator chamber exceeds a predetermined normal level. Although a float mechanism is described as a preferred means of maintaining a liquid level in the liquid accumulation chamber 56, other means of liquid level control could be used equally as well within the spirit of this invention.

In operation, a vapor-liquid mixture (not shown) is continuously fed into inlet tubing 18. The spiral vanes 20, located in tubing 18, impart a helical motion to the flow stream, and the heavier liquid components thereof are forced to the outer perimeter of the swirling flow by centrifugal force. In traveling downstream, the separated liquid droplets exit from the main flow stream through the orifices 30, 40, and 42, and fall to the bottom of chamber 14 by gravity. The flow stream exiting from the beveled end of the pipe 38 and any remaining droplets contained therein is directed against conical baffle 44. Baffle 44 reverses the generally forward flow of the stream and any droplets impinging on the baffle are coalesced and fall to the bottom of chamber 14. The flow stream, substantially free of liquid, exits the chamber 14 through the exhaust tubing 48. Liquid in the chamber drains therefrom by gravity flow via downcomers 50 and 52 into the liquid accumulation chamber 56. The separated liquid is withdrawn from chamber 56 through drain line 58. Control valve 60, operated by float 62 and valve actuator 64, maintains a liquid level in the liquid accumulation chamber 56 at a predetermined level at all times, thus preventing escape of vapor therethrough while withdrawing liquid at the rate of accumulation.

Although at least three orifices are required for the effective removal of entrained liquid from the vapor stream, the invention disclosed operates with relatively low pressure drop and eliminates the need for conventional demister pads while achieving high separation efficiencies.

Whereas the present invention has been described in particular relation to the drawings attached hereto, it should be understood that other and further modifications, apart from those shown or suggested herein, may be made within the spirit and scope of this invention.

What is claimed is:

1. A horizontal vapor-liquid separator, which comprises:
   a housing providing a separation chamber;
   a substantially horizontally disposed cylindrical inlet tubing extending through the housing wall to said separation chamber and having the inner periphery of the downstream end of said tubing beveled at a given angle outwardly in a generally frusto-conical shape;
   means located within said inlet tubing for imparting a helical motion to the vapor-liquid mixture introduced into said tubing;
   at least three cylindrical pipes, coaxially aligned with the inlet tubing, and of the same inside and outside diameter as said inlet tubing along the entire length of said at least three pipes, each of said at least three pipes having its outer periphery upstream end beveled inwardly to form a generally frusto-conical outer facing, and the inner periphery of its downstream end thereof beveled outwardly to form a generally frusto-conical inner facing, the upstream end of one of said at least three pipes being inserted in the beveled downstream end of the inlet tubing and spaced therefrom to form an annular orifice and the other of said at least three pipes mounted in spaced sequence to define additional orifices;
   the upstream end of each of said at least three pipes being swaged to define an orifice of diameter less then the diameter of said pipes, and wherein the leading edge of each of said orifices is located within the said downstream bevel of the respective adjacent upstream inlet tubing and at least three pipes;
   a solid conical baffle means mounted with its apex toward the beveled end of the last of said at least three cylindrical pipes, and spaced therefrom for coalescing any liquid droplets remaining in the flow exiting from said pipe;
   means for removing liquid collected in the separation chamber; and
   exhaust tubing extending through the housing wall into said separation chamber in substantial axial alignment with the inlet tubing.

2. A horizontal vapor-liquid separator, as recited in claim 1, wherein the means for removing liquid collected in the separation chamber comprises:
   a second housing located under the first housing providing a liquid accumulation chamber;
   downcomer means connected between the bottom of the first housing and the second housing in open communication with the separation chamber and the liquid accumulation chamber;
   a draw line connected to the lower portion of the second housing in open communication with the liquid accumulation chamber;
   a control valve operably connected to the draw line; and
   means for sensing the liquid level in the accumulation chamber and operating the control valve to maintain a predetermined level therein.

3. A horizontal vapor-liquid separator as recited in claim 2, wherein the baffle means includes a cup-like projection with the sides of said cup-like projection oriented toward said inlet tubing.

4. A horizontal vapor-liquid separator as recited in claim 3, wherein the means located within the inlet tubing for imparting a helical motion to the vapor liquid mixture comprises:
   a spiral vane secured to the inner periphery of the inlet tubing.

* * * * *